(12) United States Patent
Orii

(10) Patent No.: US 8,593,948 B1
(45) Date of Patent: Nov. 26, 2013

(54) NETWORK DEVICE AND METHOD OF CONTROLLING NETWORK DEVICE

(71) Applicant: Hitachi, Ltd., Tokyo (JP)

(72) Inventor: Masaru Orii, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 13/704,860

(22) PCT Filed: Dec. 4, 2012

(86) PCT No.: PCT/JP2012/007749
§ 371 (c)(1),
(2), (4) Date: Dec. 17, 2012

(51) Int. Cl.
*G01R 31/08* (2006.01)

(52) U.S. Cl.
USPC .......................................................... 370/229

(58) Field of Classification Search
USPC .......................................................... 370/229
See application file for complete search history.

(56) References Cited

U.S. PATENT DOCUMENTS

| | | | |
|---|---|---|---|
| 5,457,683 A * | 10/1995 | Robins | 370/258 |
| 6,035,333 A * | 3/2000 | Jeffries et al. | 709/224 |
| 6,170,022 B1 * | 1/2001 | Linville et al. | 710/29 |
| 6,771,601 B1 * | 8/2004 | Aydemir et al. | 370/231 |
| 6,816,465 B1 | 11/2004 | Barsoum et al. | |
| 7,379,676 B2 * | 5/2008 | Kang et al. | 398/168 |
| 7,486,032 B2 * | 2/2009 | Lee | 315/291 |
| 7,782,770 B1 | 8/2010 | Pannell | |
| 8,094,642 B2 * | 1/2012 | Higure et al. | 370/346 |
| 2004/0109450 A1 * | 6/2004 | Kang et al. | 370/390 |
| 2004/0252638 A1 * | 12/2004 | Gonzalez et al. | 370/229 |
| 2005/0002332 A1 * | 1/2005 | Oh | 370/229 |
| 2005/0088519 A1 * | 4/2005 | Brookins | 348/143 |
| 2006/0126511 A1 * | 6/2006 | Youn et al. | 370/235 |
| 2006/0133411 A1 * | 6/2006 | Denton et al. | 370/463 |
| 2006/0140280 A1 * | 6/2006 | Okada et al. | 375/240.28 |
| 2006/0239152 A1 * | 10/2006 | Liu et al. | 369/47.33 |
| 2006/0268709 A1 * | 11/2006 | Singla et al. | 370/235 |
| 2007/0058600 A1 * | 3/2007 | Chung et al. | 370/338 |
| 2007/0094530 A1 | 4/2007 | Kakizaki et al. | |
| 2007/0147245 A1 * | 6/2007 | Foore et al. | 370/231 |
| 2007/0211645 A1 * | 9/2007 | Tachibana et al. | 370/252 |
| 2007/0223884 A1 * | 9/2007 | Lin et al. | 386/96 |
| 2008/0037420 A1 * | 2/2008 | Tang | 370/229 |

(Continued)

FOREIGN PATENT DOCUMENTS

| | | |
|---|---|---|
| EP | 0504537 A1 | 9/1992 |
| JP | 2007-115138 A | 5/2007 |
| JP | 2011-134152 A | 7/2011 |

*Primary Examiner* — Asad Nawaz
*Assistant Examiner* — Syed S Ali
(74) *Attorney, Agent, or Firm* — Volpe and Koenig, P.C.

(57) ABSTRACT

A first network device 71 and a second network device 72 transmits a test frame and its response frame therebetween. The first network device 71 acquires a test frame transmission start time, a response frame reception completion time, a test frame reception completion time, and a response frame transmission start time, and calculates, based on the times thus acquired, a PAUSE frame action delayed period that indicates a time period required for a PAUSE frame transmitted from the first network device 71 to actually act on the second network device 72, and sends from the first network device 71 to the second network device 72 a PAUSE frame in which a time period calculated based on the PAUSE frame action delayed period is set as a PAUSE period in order to prevent shortage of a receive buffer 244 in the first network device 71 from causing a loss of frames transmitted from the second network device 72.

14 Claims, 9 Drawing Sheets

FORMAT OF PAUSE FRAME

(56) References Cited

U.S. PATENT DOCUMENTS

| | | | |
|---|---|---|---|
| 2008/0114893 A1* | 5/2008 | Youn et al. | 709/235 |
| 2008/0184319 A1* | 7/2008 | Mankovitz | 725/90 |
| 2008/0192633 A1* | 8/2008 | Ahn | 370/231 |
| 2008/0205856 A1* | 8/2008 | Kim et al. | 386/124 |
| 2008/0209021 A1* | 8/2008 | Shamma | 709/223 |
| 2008/0232251 A1* | 9/2008 | Hirayama et al. | 370/235 |
| 2008/0304415 A1* | 12/2008 | Cunningham | 370/235 |
| 2009/0116387 A1* | 5/2009 | Takai | 370/235 |
| 2009/0147685 A1* | 6/2009 | Malhotra | 370/236 |
| 2009/0248409 A1* | 10/2009 | Endo et al. | 704/226 |
| 2009/0271525 A1* | 10/2009 | Jung et al. | 709/231 |
| 2010/0020689 A1* | 1/2010 | Tang | 370/235 |
| 2010/0056054 A1* | 3/2010 | Yamato et al. | 455/41.2 |
| 2010/0056229 A1* | 3/2010 | Ying | 455/574 |
| 2010/0103816 A1* | 4/2010 | Eiro | 370/230 |
| 2010/0169776 A1* | 7/2010 | Sankar et al. | 715/716 |
| 2011/0080834 A1* | 4/2011 | Hirota et al. | 370/236 |
| 2011/0161609 A1 | 6/2011 | Oyamada et al. | |
| 2011/0302481 A1* | 12/2011 | Calvignac et al. | 714/807 |
| 2011/0305217 A1* | 12/2011 | Seok | 370/329 |
| 2012/0008502 A1* | 1/2012 | Kadambi et al. | 370/236 |
| 2012/0051252 A1* | 3/2012 | Iwao et al. | 370/252 |
| 2012/0086739 A1* | 4/2012 | Akimoto et al. | 345/690 |
| 2012/0147747 A1* | 6/2012 | Jain et al. | 370/235 |
| 2013/0016609 A1* | 1/2013 | Hayakawa et al. | 370/230 |
| 2013/0066629 A1* | 3/2013 | Konchitsky | 704/231 |
| 2013/0077489 A1* | 3/2013 | Bloch et al. | 370/235 |
| 2013/0086227 A1* | 4/2013 | Takao | 709/219 |
| 2013/0107716 A1* | 5/2013 | Volpe et al. | 370/235 |
| 2013/0149971 A1* | 6/2013 | Momono | 455/67.11 |

* cited by examiner

FORMAT OF PAUSE FRAME

| 7 (OCTETS) | 1 | 6 | 6 | 2 | 2 | 2 | 42 | 4 |
|---|---|---|---|---|---|---|---|---|
| PREAMBLE | SFD | TRANSMISSION DESTINATION ADDRESS | TRANSMISSION SOURCE ADDRESS | TYPE /SIZE | OPERATION CODE | PAUSE PERIOD | PADDING | FCS |
| 811 | 812 | 813 | 814 | 815 | 816 | 817 | 818 | 819 |

FRAME TRANSMISSION SUPPRESSION PROCESSING S1100

PARAMETERS MANAGED BY ASIC 24

| | NAME | CONTENT | FORMAT EXAMPLE |
|---|---|---|---|
| 91 | N-receive | FIRST RECEIVE BUFFER FREE SPACE NUMBER | XX |
| 92 | T-receive | AVERAGE FRAME RECEPTION INTERVAL | XXX ms XXX μs XXX ns |
| 93 | T-transfer | AVERAGE FRAME TRANSMISSION INTERVAL | XXX ms XXX μs XXX ns |
| 94 | T-pause | PAUSE FRAME ACTION DELAYED PERIOD | XXX μsS XXX ns |

NETWORK DEVICE AND METHOD OF CONTROLLING NETWORK DEVICE

TECHNICAL FIELD

The present invention relates to a network device and a method of controlling a network device.

BACKGROUND ART

PTL 1 describes a problem of a remote copy system including a plurality of nodes, for example. Specifically, in long-distance frame transfer between a transmitter node and a receiver node in accordance with Fibre Channel Protocol, the arrival of R_RDY (Receive Ready) transmitted from the receiver node to the transmitter node is delayed due to a line delay or the like in some cases. In this case, if a BB credit (Buffer to Buffer Credit) value defined in FC2 layer is insufficient, the throughput may be reduced because the port of the transmitter node cannot transmit frames for a long time period. To solve this problem, PTL 1 proposes that the BB credit value used for frame transfer is increased according to a distance between the transmitter node and the receiver node.

PTL 2 describes an operation performed by an information apparatus to acquire operation results from a plurality of storage apparatuses. Specifically, in order to highly reliably acquire the operation results at the same time point, the information apparatus detects a time difference between the internal time of the information apparatus and the internal time of each of the storage apparatuses, sets, as an execution time point for a predetermined operation for each of the storage apparatuses, a time point obtained by adding up a certain future time point and a time difference between the internal time of each of the storage apparatuses and the internal time of the information apparatus, and collects the execution results of the predetermined operations from the respective storage apparatuses after the future time point.

CITATION LIST

Patent Literature

PTL 1: Japanese Patent Application Laid-open Publication No. 2007-115138
PTL 2: Japanese Patent Application Laid-open Publication No. 2011-134152

SUMMARY OF INVENTION

Technical Problem

Nowadays, data centers, information processing centers and the like are in the process of introducing FCoE (Fibre Channel over Ethernet) ("Ethernet" is a registered trademark) for the purpose of cutting maintenance costs and the like. Since FCoE employs Extended Ethernet standard (IEEE_DCB), a transmission source transmits a frame without checking whether or not a receive buffer in a transmission destination has a free space before transmitting the frame to the transmission destination. For this reason, data transmission in accordance with FCoE requires a mechanism to prevent a frame loss properly.

The present invention has been made in view of the above problem, and has an objective to provide a network device and a method of controlling the network device which are capable of preventing a frame loss appropriately in data transmission in accordance with FCoE.

Solution to Problem

An aspect of the present invention to solve the foregoing and other problems is a network device that is a first network device communicatively coupled to a second network device, the network device including a processing unit and a receive buffer configured to store therein frames received from the second network device, wherein the processing unit sends the second network device a PAUSE frame in order to prevent shortage of the receive buffer from causing a loss of frames transmitted from the second network device, the PAUSE frame being a frame causing the second network device to stop transmitting the frames for a PAUSE period that is a time period set in the PAUSE frame, sends the second network device a test frame being a frame causing the second network device to return a frame, receives a response frame being a frame returned by the second network device in response to the test frame, acquires a test frame transmission start time that indicates a time point when processing for transmitting the test frame is started, acquires a response frame reception completion time that indicates a time point when processing for receiving the response frame is completed, receives a test frame reception completion time that is transmitted from the second network device and indicates a time point when the second network device completes processing for receiving the test frame, and a response frame transmission start time that is transmitted from the second network device and indicates a time point when the second network device starts processing for transmitting the response frame, calculates a PAUSE frame action delayed period that indicates a time period required from when the processing for transmitting the PAUSE frame is started until the second network device stops transmission of the frames, on basis of the following equation, PAUSE frame action delayed period=((Response frame reception completion time−Test frame transmission start time)−(Response frame transmission start time−Test frame reception completion time))/2, and sends the second network device the PAUSE frame in which a time period calculated based on the PAUSE frame action delayed period is set as the PAUSE period in order to prevent the shortage of the receive buffer from causing a loss of the frames transmitted from the second network device.

Other problems and solutions thereto disclosed herein will become apparent from the description in the Description of Embodiments with reference to the drawings.

Advantageous Effects of Invention

According to the present invention, frame loss can be appropriately prevented in data transmission in accordance with FCoE.

DESCRIPTION OF EMBODIMENTS

Figure 1:
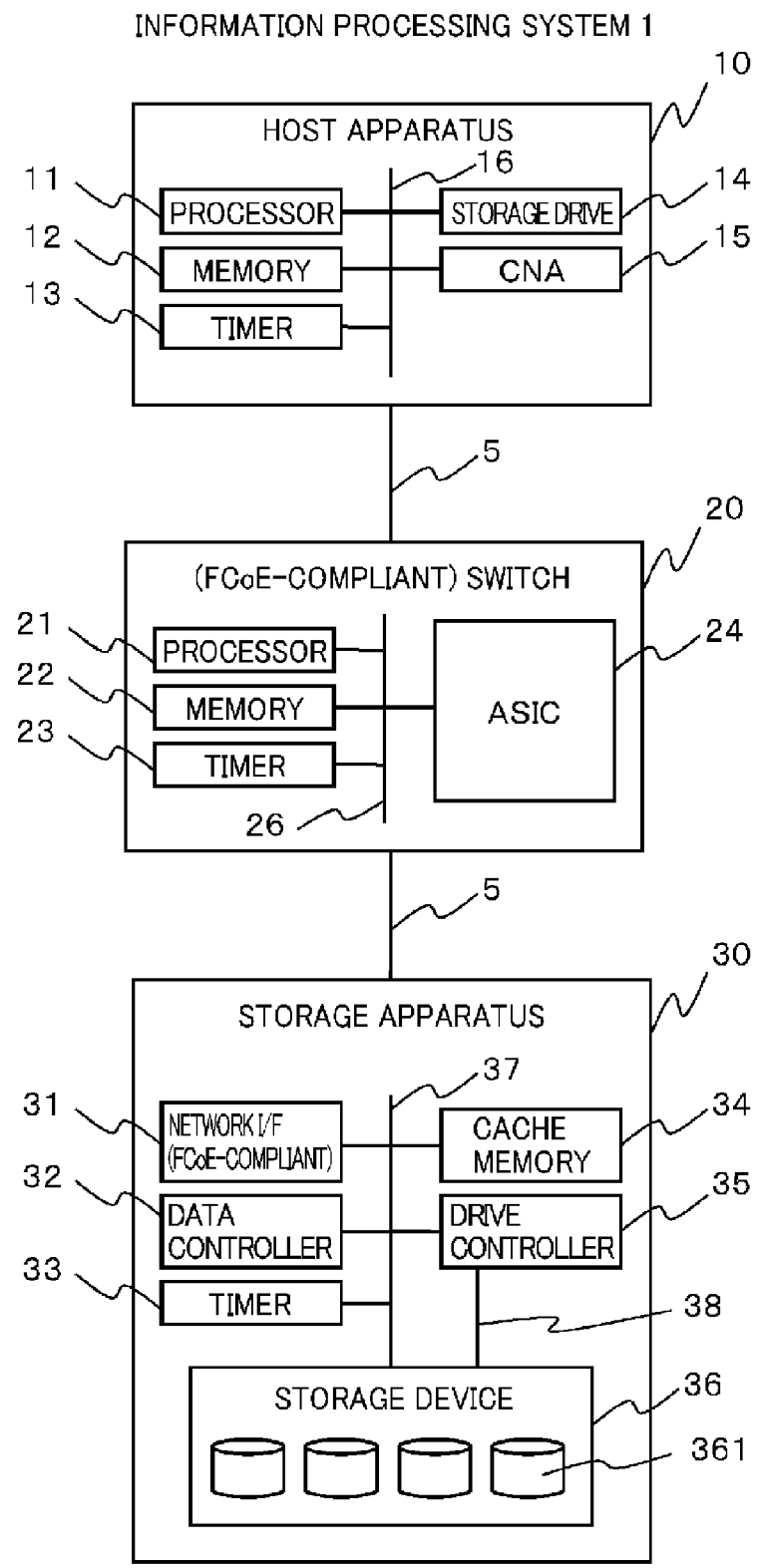
FIG. 1 illustrates a schematic configuration of an information processing system 1.

FIG. 1 illustrates a schematic configuration of an information processing system 1 (storage system) described as an embodiment. The information processing system 1 includes a host apparatus 10 (server apparatus or external apparatus), a storage apparatus 30 configured to provide data storage area to the host apparatus 10, and an FCoE-compliant switch (for example, a CNS (Converged Network Switch); hereinafter simply referred to as a switch 20) configured to relay communications between the host apparatus 10 and the storage apparatus 30 (FCoE (Fibre Channel over Ethernet ("Ethernet" is a registered trademark)). The switch 20 is a component of a communication network 5, such for example as a LAN (Local Area Network), a WAN (Wide Area Network) or a SAN (Storage Area Network), connecting the host apparatus 10 and the storage apparatus 30.

The host apparatus 10 is an information apparatus (computer) that provides services such as automated teller services in a bank, web page provider services on the Internet, or database search services. The host apparatus 10 accesses the storage area provided by the storage apparatus 30 through the communication network 5 and transmits 10 requests (write requests, read requests and the like) to the storage apparatus 30 when necessary.

The host apparatus 10 includes a processor 11 (a CPU, an MPU, or the like), a memory 12 (a RAM (Random Access Memory), a ROM (Read Only Memory), an NVRAM (Non Volatile Random Access Memory) or the like), a timer 13 (an RDTSC (Read Time-Stamp Counter), an HPET (High Precision Event Timer), an RTC (Real Time Clock) or the like) configured to generate highly accurate time information, a storage drive 14 (an HD (Hard Disk Drive), an SSD (Solid State Drive), an optical drive or the like), and a CNA (Converged Network Adapter) 15. These components are communicatively coupled to each other through a bus 16 (an MCH (Memory Controller Hub), an ICH (I/O Controller Hub), a PCI bus (PCI: Peripheral Component Interconnect) or the like).

The CNA 15 includes an FC (Fibre Channel)-compliant HBA (Host Bus Adapter), a NIC (Network Interface Card)-compliant with IEEE_DCB (CEE (Converged Enhanced Ethernet), DCE (Data Center Ethernet)), and an FCM (FCoE Mapper) configured to perform encapsulation of Fibre Channel frames (hereinafter also referred as FC frames) into Ethernet frames (packets) (or vice versa (decapsulation)). The CNA 15 implements communications with other devices such as the switch 20 in accordance with FCoE. In the following description, a simple term "frame" indicates an Ethernet frame.

The switch 20 includes a processor 21 (a CPU, an MPU or the like), a memory 22 (a RAM, a ROM, a NVRAM or the like), a timer 23 (an RDTSC, an HPET, an RTC or the like) configured to generate highly accurate time information, and an ASIC 24 (Application Specific Integrated Circuit). These components are communicatively coupled to each other through a bus 26 (a PCI bus or the like). The switch 20 includes an IEEE_DCB-compliant port (hereinafter also referred to as an Ethernet port), and one or more Fibre Channel-compliant ports (hereinafter also referred to as FC ports).

The ASIC 24 performs mapping between ports (between Ethernet ports, between an Ethernet port and an FC port, and between FC ports), data transfer (bridging) between the ports, encapsulation and decapsulation, and frame authentication (authentication of FC frames or Ethernet frames).

The storage apparatus 30 is an apparatus configured to provide a data storage area to the host apparatus 10, and is a disk array apparatus, for example. The storage apparatus 30 includes a network interface (hereinafter referred to as a network I/F 31), a data controller 32, an timer 33 (an RDTSC, an HPET, an RTC or the like) to generate highly accurate time information, a cache memory 34 (a RAM or the like), a drive controller 35, and a storage device 36. The network I/F 31, the data controller 32, the timer 33, the cache memory 34, and the drive controller 35 are communicatively coupled to each other through a bus 36 (a PCI bus, a crossbar switch or the like). The drive controller 35 and the storage device 36 are coupled to each other through a communication tool 38 (a Fibre Channel loop or the like).

The network interface 31 performs communications with the switch 20 in accordance with FC or IEEE_DCB. The network I/F 31 performs operations such as receiving an I/O request transmitted from the host apparatus 10, notifying the data controller 32 of the reception of the I/O request, analyzing the I/O request at protocol level, and sending the host apparatus 10 read data or a result of processing performed according to the I/O request. The data controller 32 includes a processor (a CPU, an MPU or the like), a memory (a ROM, a RAM, an NVRAM or the like), and a high-speed data transfer chip (a DMA (Direct Memory Access) or the like). The data controller 32 performs data transfer between the network I/F 31 and the cache memory 34 and data transfer between the cache memory 34 and the drive controller 35 in response to an I/O request transmitted from the host apparatus 10. The cache memory 34 temporarily stores therein write data to be written to the storage device 36 and read data read from the storage device 36. The storage device 36 includes one or more storage drives 361. The storage drives 361 are hard disk drives such as SATA (Serial ATA), SAS (Serial Attached SCSI), FC (Fibre Channel), PATA (Parallel ATA), and SCSI drives, or SSDs, for example. The storage device 36 controls the storage drives 361 in a RAID scheme (Redundant Arrays of Inexpensive (or Independent) Disks) (at least one of RAIDs 0 to 6), for example.

Figure 2:
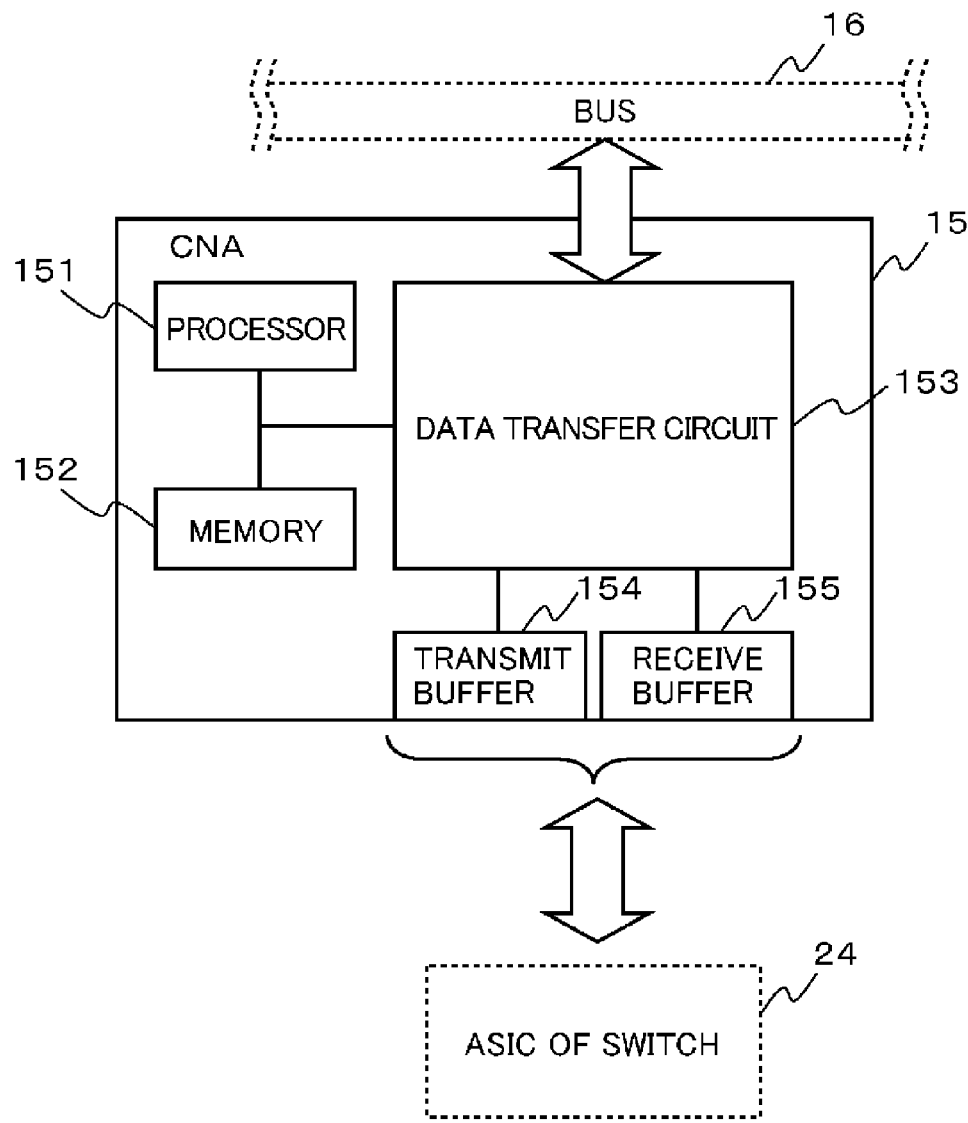
FIG. 2 illustrates a hardware configuration of a CNA 15 of a host apparatus 10.

FIG. 2 illustrates a hardware configuration of the CNA 15. As illustrated in FIG. 2, the CNA 15 includes a processor 151, a memory 152, a data transfer circuit 153, a transmit buffer 154, and a receive buffer 155. The processor 151 performs operations such as overall control of the CNA 15, and monitoring of the operation state of the CNA 15. The memory 152 stores therein various kinds of data and programs to be loaded and executed by the processor 151. The transmit buffer 154 temporarily stores therein frames to be transmitted from the host apparatus 10 to the storage apparatus 30 via the switch 20. The receive buffer 155 temporarily stores therein frames transmitted from the storage apparatus 30 via the switch 20 (for example, frames containing response information from the storage apparatus 30, and data read from the storage device 36). The data transfer circuit 153 performs operations such as communications with the other components in the host apparatus 10 via the bus 16, storing of frames (for example, frames containing an I/O request to the storage apparatus 30 and write data to be written to the storage device 36) into the transmit buffer 154, and reading of frames from the receive buffer 155 according to instructions from the processor 151.

Figure 3:
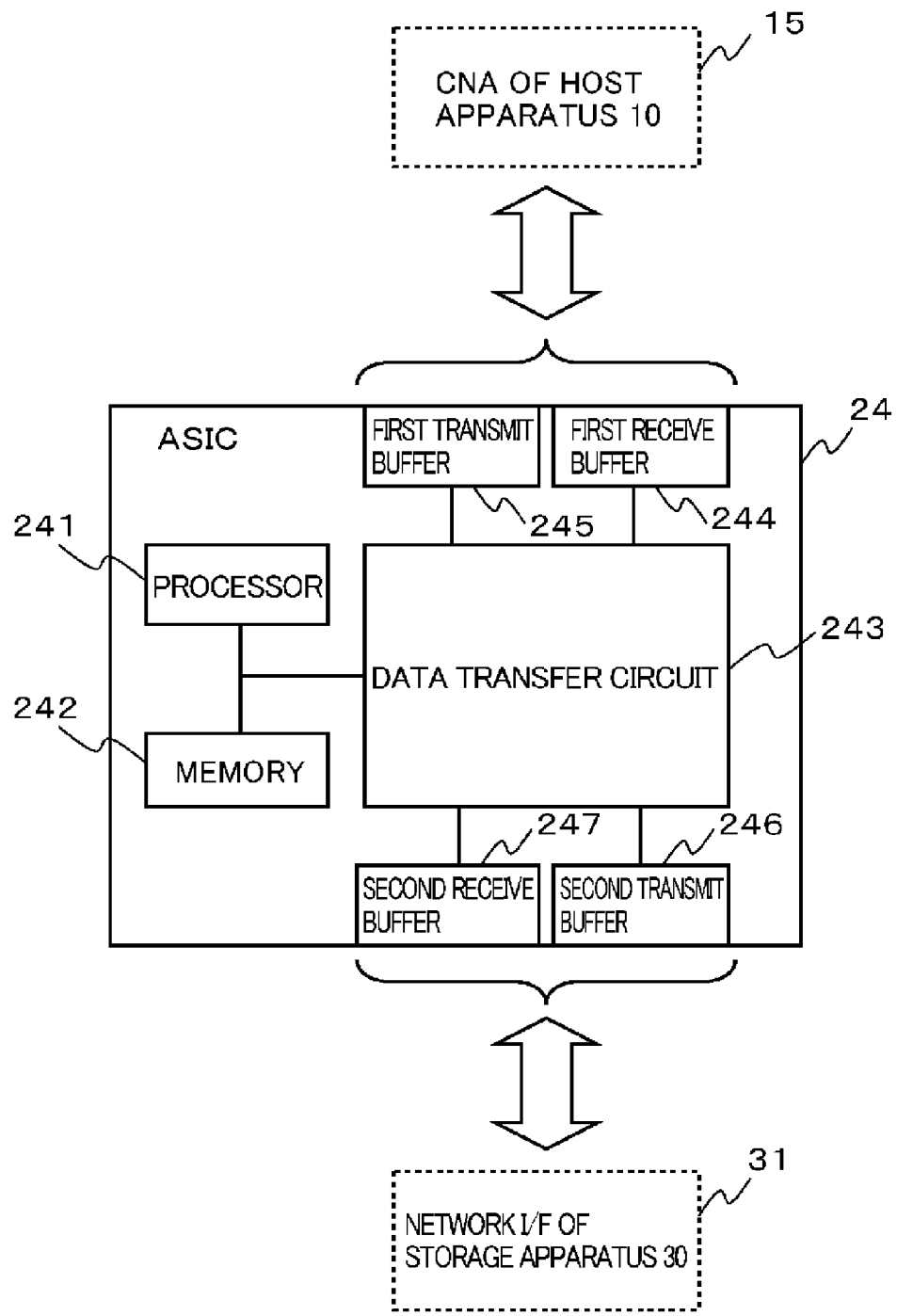
FIG. 3 illustrates a hardware configuration of an ASIC 24 of a switch 20.

FIG. 3 illustrates a hardware configuration of the ASIC 24. As illustrated in FIG. 3, the ASIC 24 includes a processor 241, a memory 242, a data transfer circuit 243, a first receive buffer 244, a first transmit buffer 245, a second transmit buffer 246, and a second receive buffer 247. The processor 241 performs operations such as overall control of the ASIC 24, and monitoring of the operation state of the ASIC 24. The memory 242 stores therein various kinds of data and programs to be loaded and executed by the processor 241. The first receive buffer 244 temporarily stores therein frames transmitted from the host apparatus 10. The first transmit buffer 245 temporarily stores therein frames to be transmitted to the host apparatus 10. The second transmit buffer 246 temporarily stores therein frames to be transmitted to the storage apparatus 30. The second receive buffer 247 temporarily stores therein frames transmitted from the storage apparatus 30. The data transfer circuit 243 transfers frames from the first receive buffer 244 to the second transmit buffer 246 and transfers frames from the second receive buffer 247 to the first transmit buffer 245 according to instructions from the processor 241.

Figure 4:
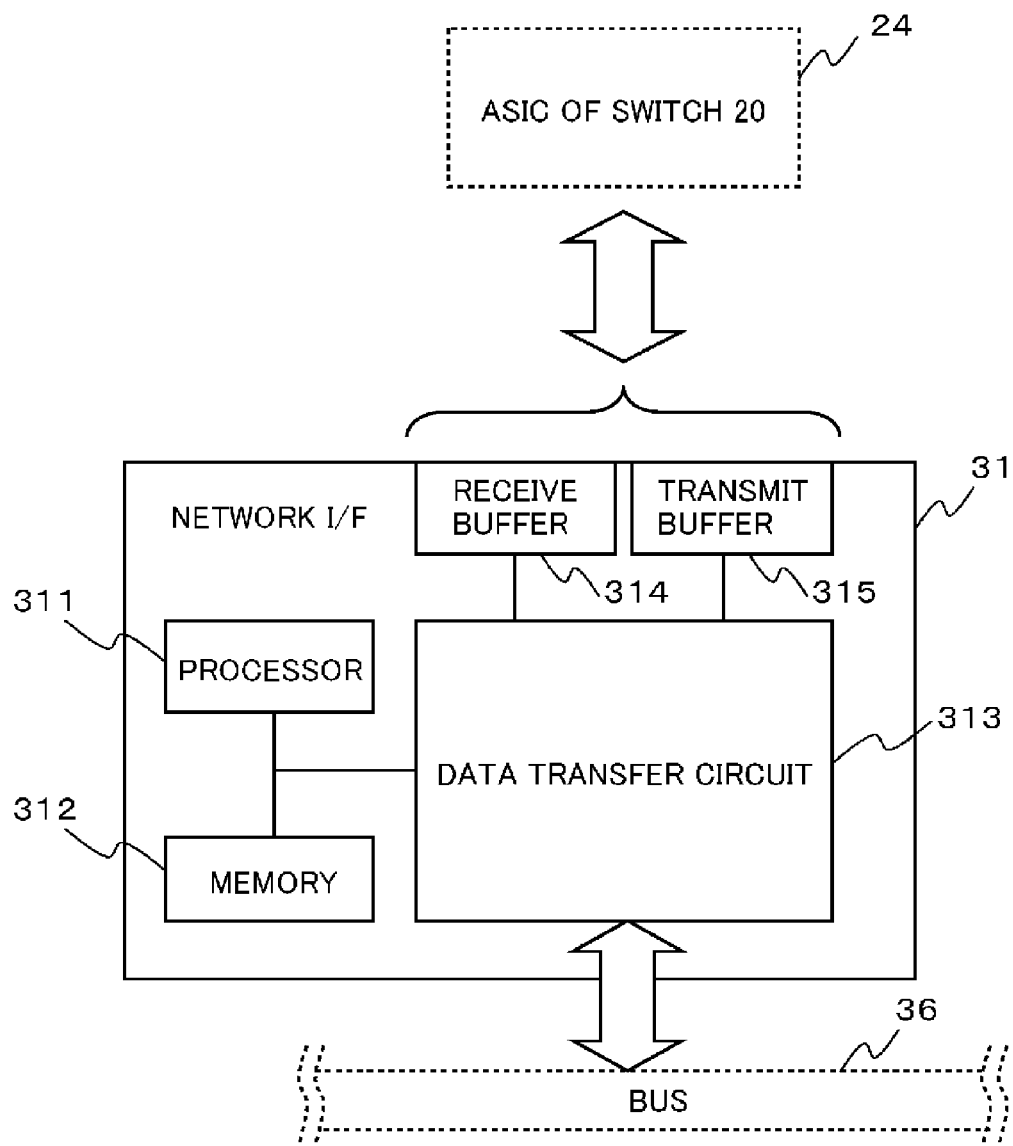
FIG. 4 illustrates a hardware configuration of a network I/F 31 of a storage apparatus 30.

FIG. 4 illustrates a hardware configuration of the network I/F 31. As illustrated in FIG. 4, the network I/F 31 includes a processor 311, a memory 312, a data transfer circuit 313, a receive buffer 314, and a transmit buffer 315. The processor 311 performs operations such as overall control of the network I/F 31 and monitoring of the operation state of the network I/F 31. The memory 312 stores therein various kinds of data and programs to be loaded and executed by the processor 311. The receive buffer 314 temporarily stores therein frames transmitted from the switch 20. The transmit buffer 315 temporarily stores therein frames to be transmitted to the switch 20 from the storage apparatus 30. The data transfer circuit 313 performs operations such as communications with the other components in the storage apparatus 30 via the bus 36, reading of frames from the receive buffer 314, and storing of frames into the transmit buffer 315 according to instructions from the processor 311.

Figure 5:
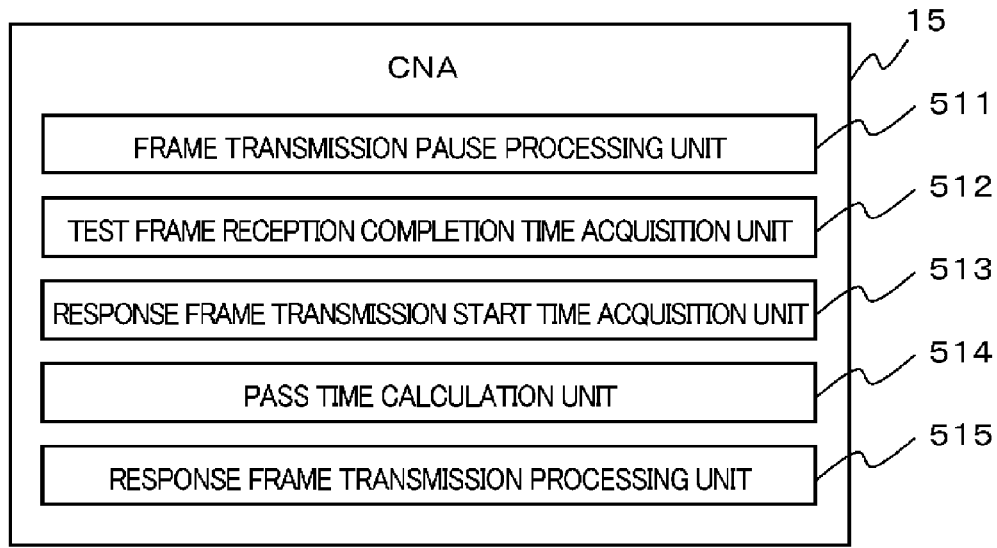
FIG. 5 is a diagram illustrating main functions that the CNA 15 has for FCoE communications.

FIG. 5 illustrates main functions that the CNA 15 has for communications in accordance with FCoE. As illustrated in FIG. 5, the CNA 15 has functions of a frame transmission pause processing unit 511, a test frame reception completion time acquisition unit 512, a response frame transmission start time acquisition unit 513, a pass time calculation unit 514, and a response frame transmission processing unit 515. Note that these functions are implemented by the processor 151 in the CNA 15 loading and executing the programs stored in the memory 152 of the CNA 15.

When receiving a PAUSE frame to be described later from the switch 20, the frame transmission pause processing unit 511 stops transmission of frames to the switch 20 for a waiting time period specified in the PAUSE frame (hereinafter referred to as a PAUSE period).

At the time the PAUSE frame action delayed period is actually measured, the test frame reception completion time acquisition unit 512 acquires a time point when processing for receiving a test frame transmitted from the switch 20 is completed (hereinafter referred to as a test frame reception completion time), and stores the test frame reception completion time in the memory 152. The test frame reception completion time acquisition unit 512 acquires the test frame reception completion time from the timer 13 as a 32-bit counter value (time stamp), for example.

The response frame transmission start time acquisition unit 513 acquires a time point when processing for transmitting a response frame is started (hereinafter referred to as a response frame transmission start time), and stores the response frame transmission start time in the memory 152. Here, the response frame is a frame to be returned to the switch 20 in response to the test frame received from the switch 20. The response frame transmission start time acquisition unit 513 acquires the response frame transmission start time from the timer 13 as a 32-bit counter value (time stamp), for example.

The pass time calculation unit 514 acquires a time period (hereinafter referred to as a pass time) obtained by subtracting the response frame transmission start time sent to the switch 20 from the test frame reception completion time sent from the switch 20, and stores the pass time in the memory 152.

The response frame transmission processing unit 515 sends the switch 20 the response frame in which the pass time is set. Note that, instead of the host apparatus 10, the switch 20 may be configured to calculate the pass time. In this case, the host apparatus 10 sends the switch 20 the response frame in which the response frame transmission start time and the test frame reception completion time are set.

Figure 6:
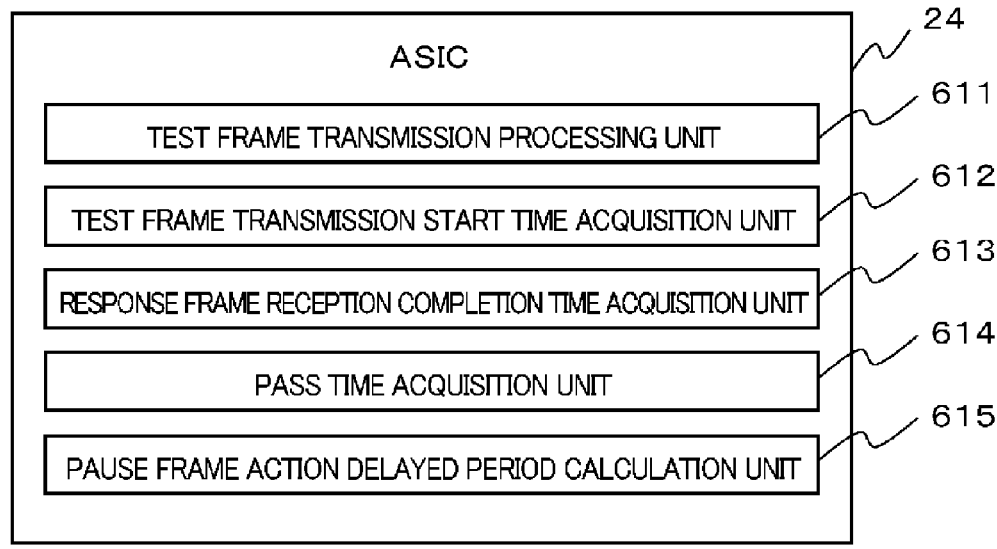
FIG. 6 is a diagram illustrating main functions that the ASIC 24 has for FCoE communications.

FIG. 6 illustrates main functions that the ASIC 24 has for communications in accordance with FCoE. As illustrated in FIG. 6, the ASIC 24 has functions of a test frame transmission processing unit 611, a test frame transmission start time acquisition unit 612, a response frame reception completion time acquisition unit 613, a pass time acquisition unit 614, and a PAUSE frame action delayed period calculation unit 615. Note that these functions are implemented by the processor 241 in the ASIC 24 loading and executing the programs stored in the memory 242 of the ASIC 24.

The test frame transmission processing unit 611 transmits a test frame to the host apparatus 10 in order to perform actual measurement of the PAUSE frame action delayed period.

The test frame transmission start time acquisition unit 612 acquires a time point when processing for transmission of a test frame to the host apparatus 10 is started (hereinafter referred to as a test frame transmission start time), and stores the test frame transmission start time in the memory 242. The test frame transmission start time acquisition unit 612 acquires the test frame transmission start time from the timer 23 as a 32-bit counter value (time stamp), for example.

The response frame reception completion time acquisition unit 613 acquires a time point when processing for reception of a response frame returned from the host apparatus 10 is completed (hereinafter referred to as a response frame reception completion time), and stores the response frame reception completion time in the memory 242. The response frame reception completion time acquisition unit 613 acquires the response frame reception completion time from the timer 23 as a 32-bit counter value (time stamp), for example.

The pass time acquisition unit 614 acquires the pass time contained in the response frame received from the host apparatus 10. In the case where the switch 20 is configured to calculate the pass time, the pass time acquisition unit 614 calculates the pass time based on the response frame transmission start time contained in the response frame and the test frame reception completion time.

The PAUSE frame action delayed period calculation unit 615 calculates the PAUSE frame action delayed period to be described later, based on the test frame transmission start time, the response frame reception completion time, and the pass time, and stores the PAUSE frame action delayed period in the memory 242.

<Optimization of PAUSE Period>

FCoE employs the extended Ethernet standard (IEEE_DCB), and a transmission source transmits frames to a transmission destination without checking whether the receive buffer of the transmission destination has a free space before transmitting the frame to the transmission destination. For this reason, in a state where the possibility that a frame loss may occur due to shortage of the receive buffer of the transmission destination becomes high, the transmission destination sends the transmission source a PAUSE frame that is a frame to cause the transmission source to suspend frame transmission.

Here, the state of the receive buffer of the transmission destination changes depending on the load conditions of the transmission destination and other apparatuses coupled to the transmission destination (for example, the storage apparatus 30 coupled to the switch 20 of the transmission destination). In addition, a time period required for the PAUSE frame transmitted from the transmission destination to the transmission source to actually act on (stop the frame transmission of) the transmission source (such time period is hereinafter referred to as a PAUSE frame action delayed period) changes depending on the load conditions of the transmission destination and the transmission source, the length and condition (aging degradation or the like) of the cable coupling the transmission destination and the transmission source, and the like. For this reason, the information processing system 1 determines the PAUSE period based on the PAUSE frame action delayed period actually measured, and sends the transmission source the PAUSE frame in which the PAUSE period is set. In this mechanism, the information processing system 1 avoids excessive suppression of the frame transmission from the transmission source, while surely preventing a frame loss.

Figures 7, 8:
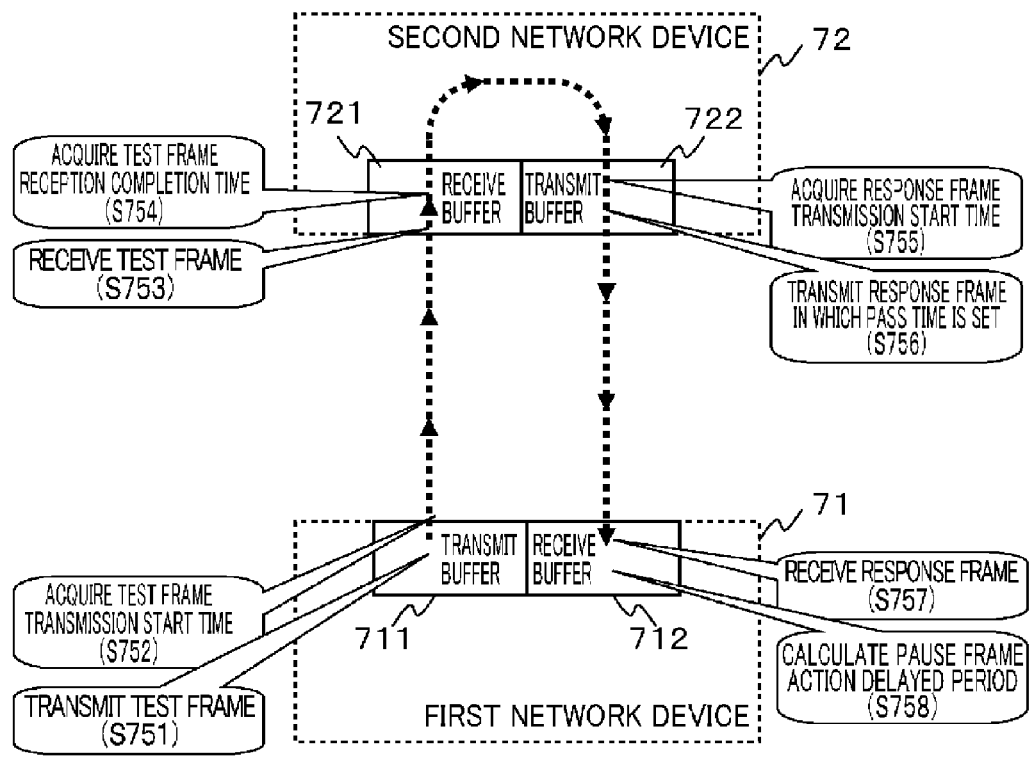
FIG. 7 is a diagram for explaining a mechanism of actually measuring a PAUSE frame action delayed period.
FIG. 8 illustrates the format of a PAUSE frame.

FIG. 7 is a diagram for explaining the foregoing method of actually measuring the PAUSE frame action delayed period in this mechanism. A first network device 71 works as the above transmission destination, and is the ASIC 24 of the switch 20, for example. In addition, a second network device 72 works as the above transmission source, and is the CNA 15 of the host apparatus 10, for example. A receive buffer 712 in the first network device 71 works as the above receive buffer included in the transmission destination, and is the first receive buffer 224 in the ASIC 24 on the switch 20, for example.

As illustrated in FIG. 7, in the actual measurement of the PAUSE frame action delayed period, the first network device 71 firstly transmits a test frame to the second network device 72 (S751). At this time, the first network device 71 also acquires and stores the test frame transmission start time (S752). In this step, the test frame sent by the first network device 71 to the second network device 72 is, for example, a frame in which the PAUSE period is set to "0" (there is no pause time of frame transmission) (hereinafter, this frame is referred to as a PAUSE(0) frame).

FIG. 8 illustrates the format of the PAUSE frame. As illustrated in FIG. 8, the PAUSE frame includes segments of preamble 811, SFD 812, transmission destination address 813, transmission source address 814, type/size 815, operation code 816, PAUSE period 817, padding 818, and FCS 819. Among them, the preamble 811 is set with synchronization information of at most 7 octets. The SFD 812 (SFD: Start Frame Delimiter) is set with synchronization information of 1 octet. The transmission destination address 813 (6 octets) is set with information (address) specifying the transmission destination of the frame. The transmission source address 814 (6 octets) is set with information (address) specifying the transmission source of the frame. The type/size 815 (2 octets) is set with information indicating the type of the frame and the data size of the frame. The operation code 816 (2 octets) is set with a code (for example, "0x0001") indicating that the frame is the PAUSE frame. The PAUSE time 817 (2 octets) is set with the aforementioned PAUSE period. The padding 818 (42 octets) can be set with any adequate value. The FCS 819 (FCS: Frame Check Sequence) (4 octets) is set with code (for example, CRC code (CRC: Cyclic Redundancy Check)) for checking a transmission error.

Returning to FIG. 7, next, the second network device 72 receives the test frame transmitted from the first network device 71 (S753). In this step, the second network device 72 acquires and stores the test frame reception completion time (S754). Subsequently, the second network device 72 starts processing for returning a response frame. In addition, the second network device 72 acquires the response frame transmission start time (S755), calculates the pass time based on the response frame transmission start time and the test frame reception completion time, and returns the response frame in which the obtained pass time is set to the first network device 71 (S756). Here, in the case where the switch 20 is configured to calculate the pass time, the second network device 72 returns the response frame in which the response frame transmission start time and the test frame reception completion time are set to the first network device 71.

In this step, the second network device 72 returns, for example, a PAUSE(0) frame as the response frame to the first network device 71. In this case, the second network device 72 sets the pass time (the response frame transmission start time and the test frame reception completion time if the switch 20 is configured to calculate the pass time) in the padding 817, for example, illustrated in FIG. 8 (uses the padding 817 as a storage location of the pass time).

Note that, if the PAUSE(0) frame is used as the test frame or the response frame, an error due to hardware and software processing performance or the like can be prevented to the maximum extent possible in the actual measurement of the PAUSE frame action delayed period. This is because the first network device 71 and the second network device 72 perform processing for the PAUSE(0) frame in the similar manners to those in the case where a PAUSE frame (the PAUSE frame having the PAUSE period set to a value other than 0) is actually transmitted from the transmission destination to the transmission source in order to prevent a frame loss. Thus, the PAUSE frame action delayed period can be obtained with high accuracy. However, the test frame or the response frame is not limited to this, but an LLDP (LLDP: Link Layer Discovery Protocol) frame, for example, may be used as the test frame or the response frame.

Upon receipt of the response frame from the second network device 72 (S757), the first network device 71 acquires the response frame reception completion time. Then, the first network device 71 calculates the PAUSE frame action delayed period by substituting this response frame reception completion time, the test frame transmission start time acquired in S752, and the pass time contained in the response frame into the following equation:

$$\text{PAUSE frame action delayed period} = ((\text{Response frame reception completion time} - \text{Test frame transmission start time}) - (\text{Response frame transmission start time} - \text{Test frame reception completion time}))/2$$

$$= (\text{Response frame reception completion time} - \text{Test frame transmission start time})/2$$

It should be noted that the above equation is derived from the point that the time period from the test frame transmission start time to the response frame reception completion time, more specifically, a time period obtained by subtracting the time period until the second network device 72 starts the transmission of the response frame after completing the reception of the test frame, from the time period until the first network device 71 completes the reception of the response frame after starting the transmission of the test frame is equivalent to twice the time period until the second network device 72 actually stops the frame transmission after the first network device 71 starts the processing for transmitting the PAUSE frame.

The PAUSE frame action delayed period is a period required after the first network device 71 determines to transmit the PAUSE frame to the second network device 72 until the second network device 72 actually stops the frame transmission. In order to obtain an accurate value as the PAUSE frame action delayed period, it is desirable to accurately acquire, as the test frame transmission start time, a time point when the first network device 71 determines to transmit the PAUSE frame to the second network device 72, and as the test frame reception completion time, a time point when the second network device 72 stops the frame transmission.

In this connection, for example, the first network device 71 is configured to acquire as the test frame transmission start time a time point when the program (or process) of transmitting the test frame to the second network device 72 is started, whereas the second network device 72 is configured to acquire as the test frame reception completion time a time point when the program (or process) of receiving the test frame is completed. In addition, the second network device 72 is configured to acquire, as the response frame transmission start time, a time point when the program (or process) of transmitting the response frame to the first network device 71 is started, whereas the first network device 71 is configured to acquire, as the response frame reception completion time, a time point when the program (or process) of receiving the response frame is completed.

<Frame Transmission Suppression Processing>

Hereinafter, description is provided for a specific processing example of suppressing frame transmission from a transmission source by sending from the transmission destination to the transmission source a PAUSE frame in which the PAUSE period is set to a value obtained based on the PAUSE frame action delayed period acquired as described above. The following description is provided based on the assumption that the transmission destination (first network device 71) is the foregoing ASIC 24 of the switch 20 in the information processing system 1, whereas the transmission source (second network device 72) is the foregoing CNA 15 of the host apparatus 10 in the information processing system 1.

Figure 9:
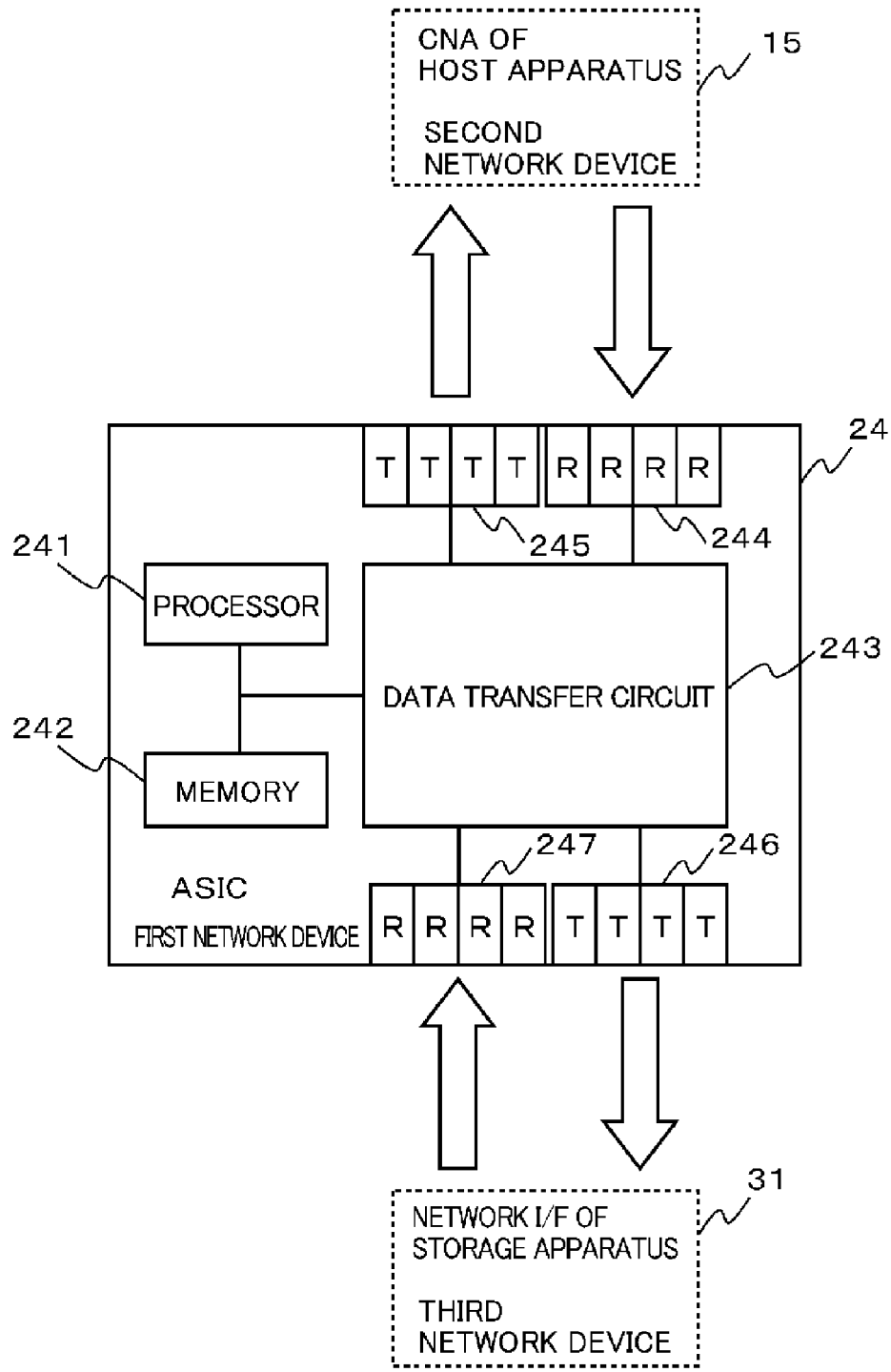
FIG. 9 illustrates a hardware configuration of the ASIC 24.

FIG. 9 illustrates a hardware configuration of the ASIC 24. In FIG. 9, the letter "T" is assigned to a apace (for example, 2500 bytes) of the transmit buffer for one frame and the letter "R" is assigned to a space (for example, 2500 bytes) of the receive buffer for one frame.

Here, let's consider a case where an average value of time periods each required for the ASIC 24 to transmit a next frame to the network I/F 31 of the storage apparatus 30 after transmission of the previous frame (hereinafter referred to as an average frame transmission interval) is increased due to an increase in the load of the storage apparatus 30 (or the load of the network I/F 31 (third network device)), and thereby the possibility that the first receive buffer 244 will become short increases to make a frame loss highly likely to occur. In this case, the ASIC 24 transmits a PAUSE frame to the CNA 15, and causes the CNA 15 to stop transmission of data.

Figure 10:
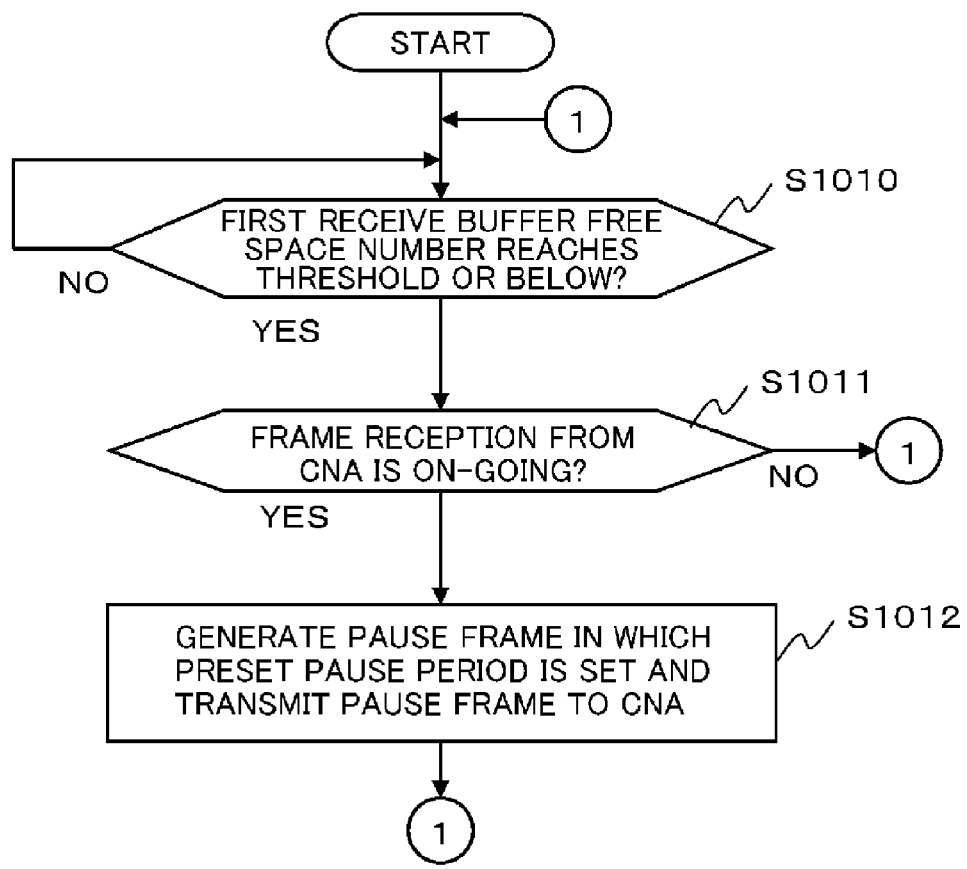
FIG. 10 is a flowchart for explaining frame transmission suppression processing S1000.

FIG. 10 illustrates a processing example for comparison (hereinafter referred to as frame transmission suppression processing S1000). As illustrated in FIG. 10, the ASIC 24 monitors in real time whether or not the number of free spaces in the first receive buffer 244 reaches a preset threshold or below (S1010: NO). When detecting that the number of free spaces in the first receive buffer 244 reaches the threshold or below (S1010: YES), the ASIC 24 judges whether or not there currently exists a frame transmitted from the CNA 15 and being about to be stored in the first receive buffer 244 (S1011). If there is no such a frame (S1011: NO), the ASIC 24 returns to the processing in S1010. On the other hand, if there is such a frame (S1011: YES), the ASIC 24 generates a PAUSE frame in which a preset PAUSE period is set, and transmits the PAUSE frame to the CNA 15 (S1012). It should be noted that, since the transmission of this PAUSE frame needs to be done immediately, the ASIC 24 transmits the PAUSE frame in preference to other frames to be transmitted to the CNA 15 even though the other frames are in the first transmit buffer 245.

In the aforementioned frame transmission suppression processing S1000, since the preset PAUSE period is set in the PAUSE frame, the PAUSE period needs to be set to a value including a margin large enough to prevent a frame loss. For this reason, the frame transmission from the CNA 15 is likely to be suppressed for a longer time period than necessary, which may possibly lead to excessive decrease in the performance of the information processing system 1.

Figures 11, 12:
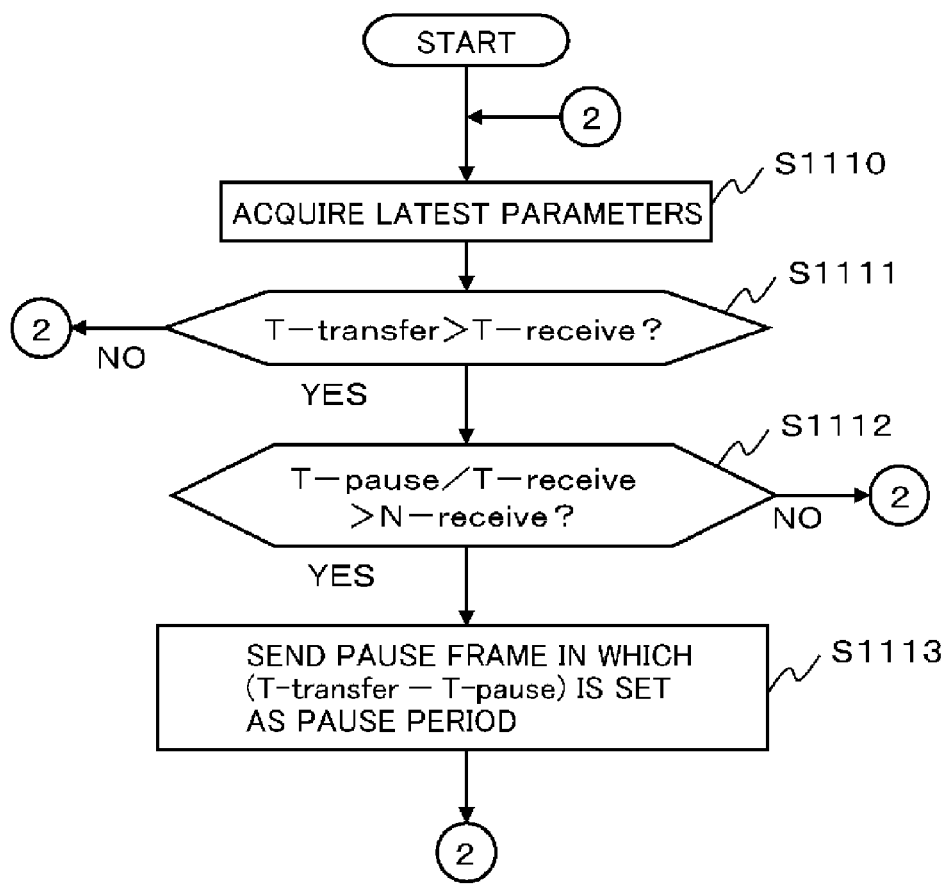
FIG. 11 is a flowchart for explaining frame transmission suppression processing S1100.
FIG. 12 is a diagram for explaining parameters managed by the ASIC 24 for execution of the frame transmission suppression processing 51100.

FIG. 11 illustrates a processing example in which the ASIC 24 suppresses frame transmission from the CNA 15 by using the foregoing PAUSE frame action delayed period (hereinafter referred to as frame transmission suppression processing S1100). In this processing, the ASIC 24 manages four parameters (N-receive 91, T-receive 92, T-transfer 93, and T-pause 94) illustrated in FIG. 12. Among them, the N-receive 91 is the number of currently-free spaces in the first receive buffer 244 (receive buffer free space number). The T-receive 92 is an average value of time periods each required until the ASIC 24 receives a next frame from the CNA 15 after receiving the previous frame (hereinafter referred to as an average frame reception interval). The ASIC 24 calculates the average frame reception interval based on the reception states of frames within a past predetermined time period, for example. The T-transfer 93 is the foregoing average frame transmission interval. The ASIC 24 calculates the average frame transmission interval based on the transmission states of frames within a past predetermined time period, for example. The T-pause 94 is the PAUSE frame action delayed period calculated in the aforementioned way.

As illustrated in FIG. 11, the ASIC 24 firstly acquires the latest values of the four parameters (N-receive 91, T-receive 92, T-transfer 93, and T-pause 94) (S1110). Next, the ASIC 24 judges whether or not the T-transfer 93 exceeds the T-receive 92, in other words, the average frame transmission interval is longer than the average frame reception interval (S1111). Note that this judgment is equivalent to checking whether or not the possibility of a frame loss becomes high due to the shortage of free spaces of the first receive buffer 244 under a situation where an increase in the load of the storage apparatus 30 or the like makes frames more likely to stay in the second transmit buffer 246 of the ASIC 24, and where frames in the first receive buffer 244 cannot be transferred to the second transmit buffer 246 and hence stay in the first receive buffer 244. As a result of the above judgment, the ASIC 24 advances the processing to S1112 if the T-transfer 93 exceeds the T-receive 92 (S1111: YES), or returns the processing to S1110 if not (S1111: NO).

In S1112, the ASIC 24 judges whether or not a quotient of the T-pause 94 divided by the T-receive 92 exceeds the N-receive 91. Here, the quotient of the T-pause 94 divided by the T-receive 92 indicates the number of frames received by the ASIC 24 from the CNA 15 after the ASIC 24 starts the processing for transmitting the PAUSE frame until the CNA 15 stops the frame transmission. In other words, this judgment is equivalent to checking whether or not there is a possibility that the number (N-receive 91) of free spaces in the first receive buffer 244 will become short after the ASIC 24 starts transmitting the PAUSE frame until the CNA 15 stops the frame transmission.

If the quotient of the T-pause 94 divided by the T-receive 92 exceeds the N-receive 91 (S1112: YES), the ASIC 24 advances the processing to S1113. If not (S1112: NO), the ASIC 24 returns the processing to S1110. In S1113, the ASIC 24 generates a PAUSE frame in which the PAUSE period is set to a time period obtained by subtracting the T-pause 94 from the T-transfer 93, and transmits the PAUSE frame to the CNA 15. It should be noted that, since the transmission of this PAUSE frame needs to be done immediately, the ASIC 24 transmits the PAUSE frame in preference to other frames to be transmitted to the CNA 15 even though the other frames are in the first transmit buffer 245.

In this step, the PAUSE period is not set to the T-transfer 93 as it is, but is set to the time period obtained by subtracting the T-pause 94 from the T-transfer 93. Since the frame transmission from the second transmit buffer 246 in the ASIC 24 to the network I/F 31 in the storage apparatus 30 is in progress during the T-pause 94, more specifically, the PAUSE frame action delayed period, the above setting aims to cause the CNA 15 to stop the frame transmission just for an actually necessary time period by subtracting the PAUSE frame action delayed period.

As has been described above, in the information processing system 1 of the present embodiment, the first network device 71 calculates the PAUSE period in consideration of the PAUSE frame action delayed period actually measured by transmitting and receiving the test frame and the response frame, and transmits the PAUSE frame in which the calculated PAUSE period is set to the second network device 72. Thus, the time period when the second network device 72 is to stop the frame transmission can be appropriately estimated. Hence, the frame transmission from the second network device 72 is not suppressed excessively, and the receive buffer in the first network device 71 can be used efficiently. In this way, the first network device 71 and the second network device 72 can be operated efficiently while surely preventing a frame loss.

In addition, since the hardware and software processing time period in the second network device 72 is considered in the actual measurement of the PAUSE frame action delayed period (by subtracting (Response frame transmission start time−Test frame reception completion time)), the PAUSE frame action delayed period can be estimated accurately.

Moreover, the second network device 72 is sent the PAUSE frame in which the PAUSE period is set to a time period obtained by subtracting the PAUSE frame action delayed period from the average frame transmission interval (an average value of time intervals at which a space for one frame becomes empty in the transmit butter). Thus, the PAUSE period can be set appropriately according to the state of the transmit buffer (the load of the storage apparatus 30 or the like) with the PAUSE frame action delayed period taken into consideration.

Further, the first network device 71 transmits the PAUSE frame to the second network device 72 if the average frame transmission interval is longer than the average frame reception interval, in other words, if a situation where the time intervals at which a space for one frame becomes empty in the transmit buffer are longer than the time intervals at which the receive buffer receives frames gives rise to the possibility of blockage of the frame transfer from the receive buffer to the transmit buffer. This prevents the second network device 72 from excessively waiting to transmit frames for a longer time period than necessary, but enables the first network device 71 and the second network device 72 to operate efficiently while surely preventing a frame loss.

Furthermore, the first network device 71 transmits the PAUSE frame to the second network device 72 if the quotient of the PAUSE frame action delayed period divided by the average frame reception interval, in other words, if the number of frames to be stored in the receive buffer during the PAUSE frame action delayed period exceeds the number of spaces currently free in the receive buffer (if the free spaces in the receive buffer are highly likely to be exhausted). This prevents the second network device 72 from excessively waiting to transmit frames for a loner time period than necessary, and enables the first network device 71 and the second network device 72 to operate efficiently while surely preventing a frame loss.

Although the embodiment has been described hereinabove, the embodiment is only for the purpose of facilitating the understanding of the present invention, and is not intended to limit the interpretation of the present invention. The present invention can be altered and modified without departing from the spirit of the present invention and also includes equivalents thereof.

The above description has been provided, for example, for the case where the first network device 71 is the ASIC 24 of the switch 20 whereas the second network device 72 is the CNA 15 of the host apparatus 10. The present invention, however, is applicable to the case where the first network device 71 is the CNA 15 of the host apparatus 10 whereas the second network device 72 is the ASIC 24 of the switch 20. In addition, the present invention is applicable to the case where the first network device 71 is the network I/F 31 of the storage apparatus 30 whereas the second network device 72 is the ASIC 24 of the switch 20. Moreover, the present invention is also applicable to the case where the first network device 71 is the ASIC 24 of the switch 20 whereas the second network device 72 is the network I/F 31 of the storage apparatus 30.

The invention claimed is:

1. A network device that is a first network device communicatively coupled to a second network device, the network device comprising:
   a processing unit configured to process frames received from the second network device; and
   a receive buffer configured to store therein the frames as received, wherein
   the processing unit
      sends the second network device a PAUSE frame in order to prevent shortage of the receive buffer from causing a loss of frames transmitted from the second network device, the PAUSE frame being a frame causing the second network device to stop transmitting the frames for a PAUSE period that is a time period set in the PAUSE frame,
      sends the second network device a test frame being a frame causing the second network device to return a frame,
      receives a response frame being a frame returned by the second network device in response to the test frame, acquires a test frame transmission start time that indicates a time point when processing for transmitting the test frame is started, acquires a response frame reception completion time that indicates a time point when processing for receiving the response frame is completed, receives a test frame reception completion time that is transmitted from the second network device and indicates a time point when the second network device completes processing for receiving the test frame, and a response frame transmission start time that is transmitted from the second network device and indicates a time point when the second network device starts processing for transmitting the response frame, calculates a PAUSE frame action delayed period that indicates a time period required from when the processing for transmitting the PAUSE frame is started until the second network device stops transmission of the frames, on basis of the following equation, PAUSE frame action delayed period=((Response frame reception completion time−Test frame transmission start time)−(Response frame transmission start time−Test frame reception completion time))/2, and sends the second network device the PAUSE frame in which a time period calculated based on the PAUSE frame action delayed period is set as the PAUSE period in order to prevent the shortage of the receive buffer from causing a loss of the frames transmitted from the second network device.

2. The network device according to claim 1, wherein the network device is communicatively coupled to a third network device, the network device comprises a transmit buffer configured to store therein frames transferred from the receive buffer and then transmitted to the third network device, the processing unit acquires an average frame transmission interval that is an average of time intervals at which frames are transmitted from the transmit buffer to the third network device, and the processing unit sends the second network device the PAUSE frame in which the PAUSE period is set to a time period obtained by subtracting the PAUSE frame action delayed period from the average frame transmission interval.

3. The network device according to claim 2, wherein the processing unit acquires an average frame transmission interval that is an average of time intervals at which frames are transmitted from the transmit buffer to the third network device, acquires an average frame reception interval that is an average of time intervals at which frames transmitted from the second network device are stored into the receive buffer, and sends the second network device the PAUSE frame when the average frame transmission interval is longer than the average frame reception interval.

4. The network device according to claim 3, wherein the processing unit acquires a receive buffer free space number that indicates the number of frames currently newly storable in the receive buffer, and the processing unit sends the second network device the PAUSE frame when a quotient of the PAUSE frame action delayed period divided by the average frame reception interval exceeds the receive buffer free space number.

5. The network device according to claim 1, wherein the processing unit sends a PAUSE(0) frame in which the PAUSE period is set to 0 as the test frame to the second network device, and the processing unit receives the PAUSE(0) frame in which the PAUSE period is set to 0 as the response frame from the second network device.

6. The network device according to claim 1, wherein the frames are Ethernet frames in FCoE (Fibre Channel over Ethernet (registered trademark)).

7. The network device according to claim 6, wherein the network device is communicatively coupled to a storage apparatus, the second network device is a CNA (Converged Network Adapter) included in a host apparatus configured to access the storage apparatus, and the network device functions as an FCoE-compliant network switch configured to relay frames exchanged between the second network device and the storage apparatus.

8. A method of controlling a network device that is a first network device communicatively coupled to a second network device, and including a receive buffer configured to store therein frames received from the second network device, the method comprising, the first network device:

sending the second network device a PAUSE frame in order to prevent shortage of the receive buffer from causing a loss of frames transmitted from the second network device, the PAUSE frame being a frame causing the second network device to stop transmitting the frames for a PAUSE period that is a time period set in the PAUSE frame, sending the second network device a test frame being a frame causing the second network device to return a frame;

receiving a response frame being a frame returned by the second network device in response to the test frame;

acquiring acquires a test frame transmission start time that indicates a time point when processing for transmitting the test frame is started, acquiring a response frame reception completion time that indicates a time point when processing for receiving the response frame is completed;

receiving a test frame reception completion time that is transmitted from the second network device and indicates a time point when the second network device completes processing for receiving the test frame, and a response frame transmission start time that is transmitted from the second network device and indicates a time point when the second network device starts processing for transmitting the response frame;

calculating a PAUSE frame action delayed period that indicates a time period required from when the processing for transmitting the PAUSE frame is started until the second network device stops transmission of the frames, on basis of the following equation, PAUSE frame action delayed period=((Response frame reception completion time−Test frame transmission start time)−(Response frame transmission start time−Test frame reception completion time))/2; and sending the second network device the PAUSE frame in which a time period calculated based on the PAUSE frame action delayed period is set as the PAUSE period in order to prevent the shortage of the receive buffer from causing a loss of the frames transmitted from the second network device.

9. The method of controlling a network device according to claim 8, wherein
- the first network device is communicatively coupled to a third network device,
- the first network device comprises a transmit buffer configured to store therein frames transferred from the receive buffer and then transmitted to the third network device,
- the first network device acquires an average frame transmission interval that is an average of time intervals at which frames are transmitted from the transmit buffer to the third network device, and
- the first network device sends the second network device the PAUSE frame in which the PAUSE period is set to a time period obtained by subtracting the PAUSE frame action delayed period from the average frame transmission interval.

10. The method of controlling a network device according to claim 9, wherein
- the first network device
  - acquires an average frame transmission interval that is an average of time intervals at which frames are transmitted from the transmit buffer to the third network device,
  - acquires an average frame reception interval that is an average of time intervals at which frames transmitted from the second network device are stored into the receive buffer, and
  - sends the second network device the PAUSE frame when the average frame transmission interval is longer than the average frame reception interval.

11. The method of controlling a network device according to claim 10, wherein
- the first network device acquires a receive buffer free space number that indicates the number of frames currently newly storable in the receive buffer, and
- the first network device sends the second network device the PAUSE frame if a quotient of the PAUSE frame action delayed period divided by the average frame reception interval exceeds the receive buffer free space number.

12. The method of controlling a network device according to claim 8, wherein
- the first network device sends a PAUSE(0) frame in which the PAUSE period is set to 0 as the test frame to the second network device, and
- the first network device receives the PAUSE(0) frame in which the PAUSE period is set to 0 as the response frame from the second network device.

13. The method of controlling a network device according to claim 8, wherein the frames are Ethernet frames in FCoE (Fibre Channel over Ethernet (registered trademark)).

14. The method of controlling a network device according to claim 12, wherein the
- the first network device is communicatively coupled to a storage apparatus,
- the second network device is a CNA (Converged Network Adapter) included in a host apparatus configured to access the storage apparatus, and
- the first network device functions as an FCoE-compliant network switch configured to relay frames exchanged between the second network device and the storage apparatus.

* * * * *